United States Patent [19]

Rich

[11] Patent Number: 4,653,708
[45] Date of Patent: Mar. 31, 1987

[54] TWIST-IN MOUNTING FOR A THERMOSTAT

[75] Inventor: William N. Rich, Mansfield, Ohio

[73] Assignee: Hamilton Standard Controls, Inc., Windsor Locks, Conn.

[21] Appl. No.: 809,376

[22] Filed: Dec. 16, 1985

[51] Int. Cl.⁴ .............................................. G12B 9/00
[52] U.S. Cl. .................. 248/27.1; 248/224.4; 248/231.9; 248/221.3; 248/222.3; 403/348; 24/590; 337/380
[58] Field of Search .............. 248/27.1, 27.3, 221.3, 248/222.1, 222.2, 222.3, 224.4, 231.9, 274; 403/348, 349; 24/590, 597; 337/112, 380; 339/127 R, 188 R

[56] References Cited

U.S. PATENT DOCUMENTS

| | | | |
|---|---|---|---|
| 2,715 | 7/1842 | Fowler | 248/222.3 |
| 2,012,979 | 9/1935 | Von Holtz | 339/127 R |
| 2,117,761 | 5/1938 | Douglas | 339/127 R |
| 2,272,688 | 2/1942 | Catron | 248/27.1 |
| 2,278,385 | 3/1942 | Watts | 339/127 R |
| 2,632,787 | 3/1953 | Thomas | 339/127 R |
| 2,849,697 | 8/1958 | Farison | 339/127 R |
| 3,017,599 | 1/1962 | Loesch | 339/127 R |
| 3,047,829 | 7/1962 | Mouat | 339/127 R |
| 3,279,728 | 10/1966 | Campbell | 248/27.1 |
| 3,335,471 | 8/1967 | Seckerson | 24/593 |
| 3,885,767 | 5/1975 | Olowinski | 248/27.1 |
| 3,949,217 | 4/1976 | Howe et al. | 339/127 R |
| 4,029,953 | 6/1977 | Natoli | 339/127 R |
| 4,533,894 | 8/1985 | Bishop et al. | 337/102 |

FOREIGN PATENT DOCUMENTS 2440186 3/1976 Fed. Rep. of Germany ... 248/222.3

Primary Examiner—Cornelius J. Husar
Assistant Examiner—Eric K. Nicholson
Attorney, Agent, or Firm—Stephen A. Schneeberger

[57] ABSTRACT

A thermostat mounting arrangement includes a thermostat fixedly retained by a mounting member, and the mounting member then being mounted in a panel using a "twist-in" motion. The mounting member is of one-piece metal construction having a tubular housing portion, a pair of rigid arcuate flanges at its base and, intermediate the arcuate flanges, a pair of separate resilient flange tabs. The flange tabs are spaced above the rigid arcuate flanges and include downwardly-extending detent knobs. The panel includes a notched aperture for passing the mounting member housing and the flange tabs in a certain rotative position. The flange tabs are inclined to facilitate both the rotation of the mounting member relative to the panel and its retention in the panel. The mounting member is rotated until the detent knobs on the flange tabs detentingly snap into detent holes in the panel.

8 Claims, 7 Drawing Figures

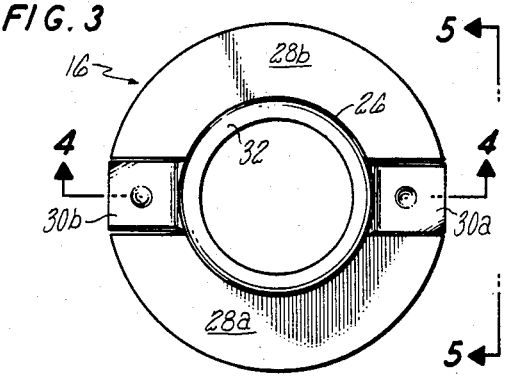
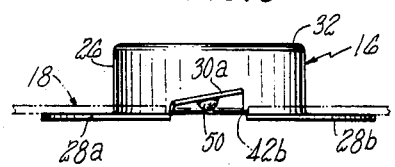
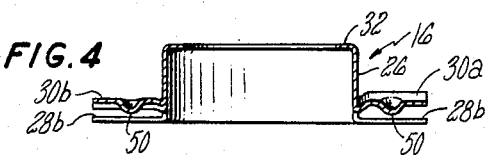
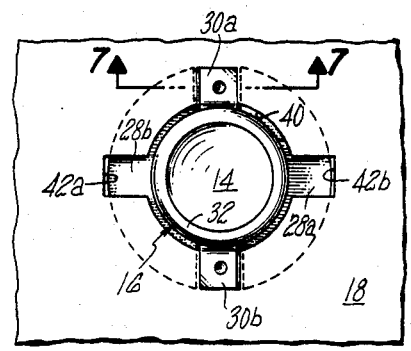
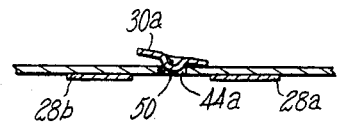

TWIST-IN MOUNTING FOR A THERMOSTAT

DESCRIPTION

1. Technical Field

The present invention relates to a mounting arrangement and more particularly to a twist-in mounting for a thermostat.

2. Background Art

Numerous mounting arrangements have been developed and/or disclosed for mounting various electrical devices to some support structure, such as a panel. In the instance of thermostats, the mounting arrangement has typically been of a relatively durable and permanent nature to accommodate the environment, as by employing mechanical fasteners, such as screws, extending between a metal mounting member and the panel on which it is to be mounted.

In the instance of other types of electrical devices such as indicator lamps, some types of switches and electrical connectors which may reside in a more moderate environment, the mounting arrangement has often been one which is readily inserted into and removed from the support panel, as by pinch-type snap locks or by twist-in/twist-out mounting arrangements. Examples of this latter type of mounting arrangement are disclosed in U.S. Pat. Nos. 2,272,688; 2,278,385; 2,632,787; 2,849,697; 3,047,829; 3,949,217 and 4,029,953. Most of these patents describe an arrangement in which a mounting aperature is provided with notches or keyways, and the mounting member is provided with one or more tabs which are passed through those notches and are rotated into engagement with an opposite surface of the panel. In some instances the mounting member is maintained in position by a frictional retentive force. In other instances, a positive form of positive detenting is employed. Examples of such detenting are disclosed in U.S. Pat. Nos. 2,632,787 and 3,047,829.

In U.S. Pat. No. 2,632,787, a lamp socket support fixture is adapted to be mounted through an aperture in a panel, the aperture having a pair of notches at opposite ends. The socket supporting fixture includes a flange which includes a pair of fingers 48 for insertion through the notches in the aperture and an additional pair of detents located in quadrature with the fingers for providing detenting engagement with the aperture notches when the structure is rotated.

U.S. Pat. No. 3,047,829 discloses a lamp base and mounting arrangement formed of molded plastic and having a continuous, resilient, cup-shaped circular flange for engaging one surface of a mounting panel and a plurality of rigid key ears for engaging the other surface of the panel and resisting withdrawal. A key is provided on one of the rigid ears for extending into an opening in the panel to lock the base against rotation. To rotate the base into correct orientation for detecting engagement by the key, it is necessary to provide an inward thrust against the resilient force of the circular flange. To then determine when to release that thrust, an elongated stop is provided on another one of the ears to limit rotation at a correct angle for engagement of the detent key.

While the foregoing mounting structures may generally be suitable for their intended purposes, they may also possess a complexity or cost which is not warranted in the provision of a low cost, easily-used mounting member which is suitable for mounting a thermostat to a support panel for operation in its particular environment. Disclosure Of Invention Accordingly, it is a principal object of the present invention to provide a mounting arrangement, and particularly a mounting member, for mounting a thermostat on a support panel, and which is of relatively low cost to manufacture and is simple in its installation. Included within this object is the provision of such a mounting member which fixedly retains a thermostat therewithin.

Accordingly, there is provided a mounting member for mounting a thermostat on a panel without requiring separate fasteners. The panel has spaced, substantially parallel and oppositely facing surfaces and includes a mounting aperture extending therethrough. The mounting aperture includes a plurality of radial notches and further includes a plurality of angularly-spaced holes extending therethrough and which are angularly displaced from the notches. The holes may be radially outward of the aperture and may be circular to facilitate a detenting function. The mounting member is of one piece, metal construction and includes a tubular housing portion which fixedly retains the thermostat, and a mounting flange portion. The mounting flange portion includes a first relatively rigid portion for engaging one of the surfaces of the panel and a plurality of separate resilient tabs longitudinally spaced from the first mounting flange portion for resiliently engaging the other surface of the panel.

The first mounting flange portion is configured to resist passage through the notched panel aperture and the tabs are configured to pass through the notched aperture in a first rotative position and to resist such passage in other rotative positions relative to the panel. Further, the tabs each include a respective knob formed by an upset thereon, the positioning of the tabs and the knobs thereon being such that each knob is received in a respective hole in the panel in a second rotative position of the support member relative to the panel, thereby to yieldably retain the mounting member against rotation relative to the panel. Each tab is inclined such that its longitudinal spacing from the first mounting flange portion varies circumferentially with respect to the housing portion to facilitate rotation of the mounting member into detented engagement with the panel, especially for a range of panel thicknesses, and to ensure secure retention of the mounting member on the panel. The first mounting flange portion is typically formed as two arcuate flange elements extending radially outward from an end of the housing portion. The longitudinal spacing of the tabs from that first mounting flange portion is longitudinally in the direction of the housing and is formed by a generally L-shaped displacement of the tabs relative to the first mounting flange portion. The thermostat is fixedly retained in the mounting member housing against relative rotation, as by crimping, and extends outwardly therefrom to provide a surface for receiving a gripping force to enable the mounting of the mounting member and thermostat on the panel.

BRIEF DESCRIPTION OF THE DRAWINGS

FIG. 3 is a top view of the mounting member of the invention;

FIG. 4 is a sectional view of the mounting member taken along line 4—4 of FIG. 3;

FIG. 5 is a side view of FIG. 3, taken along line 5—5 thereof and including part of the support panel shown in broken line;

FIG. 6 is a top view of the thermostat and mounting member shown operatively mounted in the support panel; and FIG. 7 is a sectional view of the thermostat mounting arrangement depicted in FIG. 6 and taken along line 7—7 thereof.

BEST MODE FOR CARRYING OUT THE INVENTION

Figure 1:
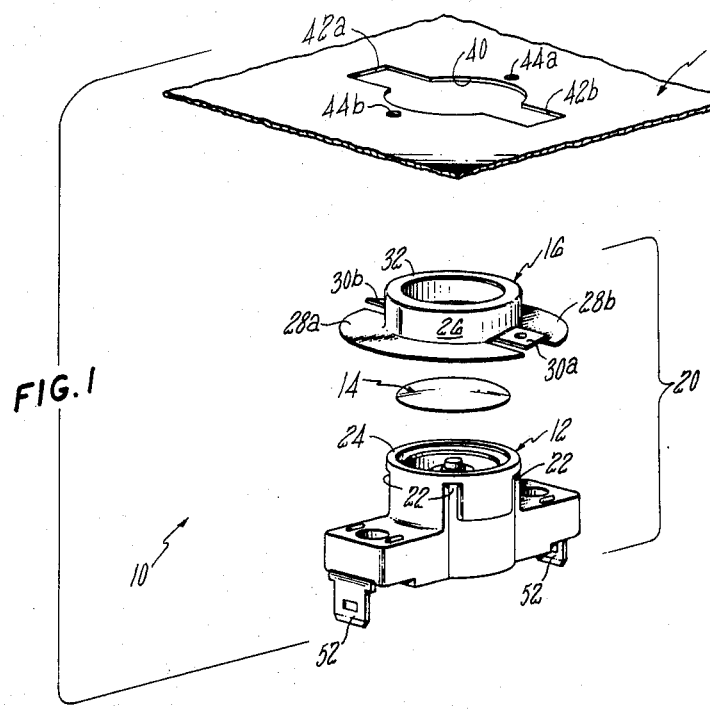
FIG. 1 is an exploded perspective view of the thermostat, mounting member and support panel employed in the mounting arrangement of the invention.
Figure 2:
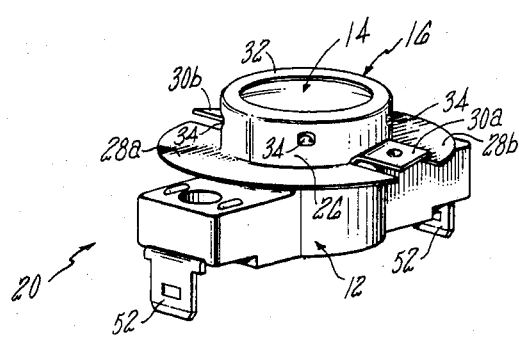
FIG. 2 is a perspective view of the subassembly formed by fixedly retaining a thermostat in the mounting member.

Referring to FIG. 1 there is depicted, in exploded form, a thermostat mounting arrangement, generally designated 10 and comprising a conventional thermostat body 12 incorporating appropriate electrical contacts, a bimetallic actuating disc 14, a mounting member 16 and a support panel 18. The thermostat 12 and bimetallic disc 14 are fixedly retained within support member 16 to form a subassembly 20, as further depicted in FIG. 2.

The thermostat body 12 may be generally formed of a rigid, high-temperature resistant plastic and include appropriate electrical contacts internally thereof and external terminals 52. Thermostat 12 is structured such that four-radially recessed, longitudinally-extending channels 22 extend along a tubular portion of the thermostat body to an annular shoulder 24 at the upper end which extends radially outward beyond the base of the channels 22.

The mounting member 16 of the invention is preferably of one-piece, metal construction to minimize its cost while preserving resistance and durability to heat in the thermal environments associated with various heating appliances. The mounting member 16 principally includes a tubular housing portion 26 with a radially-extending mounting flange portion at its base. The mounting flange portion comprises a pair of substantially-rigid, arcuate mounting flanges 28a and 28b and a pair of separate resilient mounting flange tabs 30a and 30b.

To fixedly join the thermostat body 12 with the mounting member 16, the bimetallic disc is positioned on the top of the thermostat body and the housing portion 26 of mounting member 16 is moved downwardly thereover. An annular rim 32 extends radially-inwardly from the top of housing portion 26 to define an upper limit to that housing portion. The mounting member 16 is then crimped at four locations 34 (only three being shown in FIG. 2) which are respectively aligned with the channels 22 in the thermostat body 12 and are positioned immediately beneath the shoulder 24. In this way the thermostat body 12 and bimetallic disc 14 are fixedly retained within the mounting member 16. The bimetallic disc 14 may be directly exposed to an operating environment by virtue of the circular opening at the top of the mounting member 16, however, rim 32 might be a continuous surface such that disc 14 is covered if the thermal response rate is not critical.

In accordance with the invention, the mounting panel 18, which may form part of an appliance, includes a pair of spaced, substantially parallel and oppositely facing surfaces. Panel 18 includes a circular mounting aperture 40 extending therethrough, the aperture 40 having a pair of diametrically-opposed, radially-outwardly extending rectangular notches 42a and 42b. The diameter of aperture 40 is somewhat larger than that of the outside diameter of the housing portion 26 of mounting member 16 to permit a mounting clearance. Additionally, the radial and angular dimensioning of the notches 42a and 42b is such as to clear the mounting flange tabs 30a and 30b as will be explained. The panel 18 additionally includes a pair of small circular detent holes 44a and 44b extending therethrough for a purpose to be hereinafter explained. The detenting holes 44a and 44b are diametrically opposite one another and are positioned in quadrature with the notches 42a and 42b.

Referring to FIGS. 3–5 for a further understanding of the structure of the mounting member 16, each of the arcuate flanges 28a and 28b will be seen to angularly embrace approximately 160–170 degrees of the circumference of the mounting member and are substantially normal to the housing portion 26. The flange tabs 30a and 30b, on the other hand, are relatively narrow, each being of about 10–20 degrees angular extent, and are struck or lanced from the metal of member 16 such that they generally have a "rotated" L-shape when viewed circumferentially and are thereby longitudinally, or axially, offset from the flange portions 28a and 28b. More specifically, the tabs 30a and 30b are longitudinally offset from the flange portions 28a and 28b in a direction which is relatively upward, or toward, the housing portion 26 from its base. The mounting member 16 is formed of stainless steel having a typical thickness of 0.012 inch, such that the tabs 30a and 30b are thin members which are cantilevered and sufficiently narrow as to afford resiliency in the axial direction.

Moreover, each of the tabs 30a and 30b is twisted or rotated several degrees from the horizontal about an axis extending radially from the mounting member 16 such that it is inclined in a circumferential direction, as depicted most clearly in FIG. 5. This incline of tabs 30a and 30b facilitates relative lead in of panel 18 when member 16 is rotated into its operative position particularly for a range of thicknesses of panel 18, and also ensures secure retention of member 16 on panel 18. The edge of each tab 30a and 30b having the greatest axial displacement from the associated flange 28a or 28b determines the direction in which the support member 16 is to be rotated and will exceed the maximum contemplated thickness of a panel 18. On the other hand, the axial spacing of the trailing edge of the respective tabs 30a, 30b is preferably somewhat less than that of the minimum comtemplated thickness of a panel 18.

Importantly to the invention and further referring to FIG. 5, each of the flange tabs 30a and 30b is provided with a respective detent protrusion or knob 50. The knob 50 is generally of circular, dome shape and is formed by an upset in respective tabs 30a, 30b during the progressive forming operation which defines the flanges 28a, 28b and tabs 30a and 30b. The axial amplitude or extent of the knob 50 is typically such that it determines the minimum axial spacing between tabs 30a, 30b and the arcuate flanges 28a, 28b. FIG. 5 depicts a tab 30a in its unstressed condition, having been inserted through a notch 42a in panel 18 preparatory to relative rotation in a rightward direction which results in the resilient engagement of the opposite surfaces of panel 18 by the tab knob 50 and the upper surfaces of the annular flanges 28a, 28b.

Referring to the FIGS. generally, including FIGS. 6 and 7, the assembly 20 is gripped, as by the terminals 52 being grasped between a person's fingers, and is oriented in a position which allows upward insertion of the support member housing portion 26 and the flange tabs 30a, 30b through the mounting slot 40 and notches 42a, 42b, respectively (as in FIG. 5). The assembly 20 is then rotated in a counterclockwise direction, as viewed from the top, such that the uppermost edge of the flange tabs 30a, 30b "leads" over the respective arcuate flange portions 28b, 28a. During such rotation the upper surface of the flanges 28a, 28b and the detent knobs 50 oppositely engage the panel 18. Rotation continues for about 90 degrees until knobs 50 align with detent holes 44a and 44b. The diameter of detent holes 44a, 44b is slightly greater than that of the knobs 50 and the resilient force provided by the stressed flange tabs 30a, 30b causes the respective knobs to move downward into the respective detent holes, as depicted in FIG. 7, to thereby firmly detent the mounting member 16 and thus the assembly 20.

The aforedescribed arrangement has been found to position and retain the thermostat 12 and mounting member 16 very securely within the panel 18. Should it be necessary to remove the assembly 20, that is easily accomplished by applying a sufficient manual torsional force for disengaging the detenting knobs 50 and then rotating the assembly to a rotative position which permits its withdrawal from the panel 18. The mounting member 16 is conveniently and inexpensively formed by a series of successive stamping, lancing and/or drawing operations. In one particular embodiment, the panel 18 has a thickness of about 0.030 inch; the mounting member housing 26 has a diameter of about 0.9 inch; the arcuate flanges 28a and 28b each extend radially outward an additional 0.3 inch; the average axial spacing between the undersurface of the flange tabs 30a, 30b at their midpoints and the upper surface of a respective flange 28a, 28b, aside from the detent holes 50, is approximately 0.030 inch; and the knobs 50 may extend an additional 0.010 inch toward the flange portions 28a, 28b from the plane of the tabs 30a, 30b and are positioned radially about midway along the length of the tabs. Panel thicknesses in the range of 0.15–0.35 inch are typical.

Although this invention has been shown and described with respect to detailed embodiments thereof, it will be understood by those skilled in the art that various changes in form and detail thereof may be made within departing from the spirit and scope of the claimed invention.

Having thus described a typical embodiment of the invention, that which is claimed as new and desired to secure by Letters Patent of the United States is:

1. A mounting member for mounting a thermostat on a panel, the panel having spaced, substantially parallel and oppositely facing surfaces and including a mounting aperture extending therethrough and having a plurality of radial notches, the panel further including a plurality of holes extending therethrough and being angularly displaced from said notches as one part of a complementary detenting means, said mounting member being of one piece and comprising:

a housing portion and a mounting flange portion, said housing portion being configured to receive a thermostat therein, and said mounting flange portion extending transversely outward from said housing portion for engaging said panel, said mounting flange portion including a first relatively rigid portion for engaging one said surface of the panel and a plurality of separate resilient tabs longitudinally spaced from said first portion for resiliently engaging the other said surface of the panel, said first mounting flange portion being configured to resist passage through the notched aperture and said tabs being configured to pass through said notched aperture in a first rotative position and to resist said passage in other rotative positions relative to said panel, and wherein said tabs each include a respective knob formed by an upset thereon, the positioning of said knobs being such that each knob is received in a respective hole in said panel in a second rotative position of said support member relative to said panel thereby to yieldably retain said mounting member against rotation relative to said panel.

2. The mounting member of claim 1 wherein each said tab is inclined such that its longitudinal spacing from said first mounting flange portion varies in a circumferential direction with respect to said housing portion to facilitate rotation of said mounting member into said detented engagement with said panel for a range of panel thicknesses and to ensure secured retention.

3. The mounting member of claim 2 wherein said housing portion is tubular, said first mounting flange portion extends radially outward from an end of said housing portion and said longitudinal spacing of said tabs from said first mounting flange portion is toward said housing portion.

4. The mounting member of claim 2 wherein said first mounting flange portion extends from one end of said housing portion and said longitudinal spacing of said tabs from said first mounting flange portion is toward said housing portion.

5. The mounting member of claim 3 wherein said thermostat is fixedly retained in said housing portion against relative motion and extends outwardly therefrom to provide a surface for receiving a gripping force to enable the mounting of said mounting member and thermostat on said panel.

6. The mounting member of claim 5 wherein said member is formed of metal and said tabs appear as substantially an L-shaped displacement of metal relative to said first mounting flange portion.

7. The combination of a panel, a mounting member and a thermostat, said thermostat being fixedly retained in said mounting member and said mounting member being mounted on said panel, and wherein said panel has spaced, substantially parallel and oppositely facing surfaces having a circular mounting aperture extending therethrough, said mounting aperture including a plurality of angularly-spaced notches extending radially outward therefrom, said panel further including a plurality of circular detent holes extending therethrough in angularly-spaced relation with said notches and radially-spaced relation with said mounting aperture, said mounting member being of one-piece, metal construction and including a tubular housing portion having a pair of relatively rigid, arcuate mounting flanges extending radially outward therefrom at one end and a pair of separate resilient tabs extending radially outward therefrom angularly intermediate said arcuate flanges, said tabs being axially-spaced from said arcuate flanges in a direction toward said housing and by a distance which affords resilient engagement of said panel therebetween, said housing portion and said tabs being configured for insertion through said notched aperture in said panel in a first particular rotative position, said arcuate mounting flanges being configured to resist insertion through said notched aperture in said panel in substantially all rotative positions, and said tabs including circular knob-like protrusions extending axially toward said arcuate flanges for detenting engagement with said panel within respective said detenting holes when said mounting member is rotated to a second particular rotative position.

8. The combination of claim 7 wherein said mounting member tabs are each inclined to provide a lead-in with said panel when said mounting member is rotated from said first to said second rotative position.

* * * * *